United States Patent [19]

Holland

[11] 4,154,015

[45] May 15, 1979

[54] FISHING ROD HOLDER

[76] Inventor: Fred D. Holland, 515 D. St., Apt. #10, San Rafael, Calif. 94901

[21] Appl. No.: 842,671

[22] Filed: Oct. 17, 1977

[51] Int. Cl.² .......................................... A01K 97/10
[52] U.S. Cl. ........................................................ 43/17
[58] Field of Search ............................ 43/16, 17, 21.2

[56] References Cited

U.S. PATENT DOCUMENTS

| | | | |
|---|---|---|---|
| 3,012,354 | 12/1961 | Hansen | 43/17 |
| 3,560,969 | 2/1971 | Fleeman | 43/21.2 |
| 3,903,633 | 9/1975 | Hutcherson | 43/17 |

*Primary Examiner*—Robert C. Watson

*Attorney, Agent, or Firm*—Phillips, Moore, Weissenberger, Lempio & Majestic

[57] ABSTRACT

A fishing rod holder comprises a tubular holder adapted to have the handle of a fishing rod retained therein. A flexible support member is disposed in the holder to extend in diverging relationship towards the forward end of the holder and has a rearward end thereof secured to a bottom wall of the holder. A normally open switch comprising first and second electrical contacts mounted on the holder and the support member, respectively, is adapted to close upon downward flexing of the support member relative to the holder when the weight of a fish is imposed on the fishing rod. The contacts are connected to a battery, buzzer and light to alert a fisherman when a fish is caught.

17 Claims, 3 Drawing Figures

FISHING ROD HOLDER

BACKGROUND OF THE INVENTION

This invention relates to a fishing rod holder adapted to alert a fisherman when a fish has been caught.

Fishing rod holders of this type are generally well known in the art as exemplified by those disclosed by U.S. Pat. Nos. 3,646,697; 3,835,462; 3,999,323; 3,992,798 and 4,004,365. The fishing rod holder normally comprises a tubular member pivotally mounted on a support and adapted to receive the handle of a fishing rod therein. The member may be spring-biased and adjusted to preset the gap between a pair of electrical contacts mounted on the holder and the support, respectively. The contacts are adapted to close to activate a light and/or buzzer to alert the fisherman when a fish is caught and upon pivoting of the holder to close the contacts.

SUMMARY OF THE INVENTION

An object of this invention is to provide an improved fishing rod holder which is compact, exhibits a high degree of structural integrity and the ability to receive fishing rod handles of varying sizes and is adapted to be assembled and disassembled for servicing purposes expeditiously.

The fishing rod holder comprises a tubular holder adapted to retain a handle of a fishing rod therein and a flexible support member disposed in the holder to extend in diverging relationship towards a forward end thereof. A rearward end of the support member is solely secured to a bottom wall of the holder whereby the support member is disposed in cantilevered relationship in the holder for flexing between first and second positions therein. Normally open first and second electrical contact means, constituting a switch, are mounted on the holder and on the support means, respectively, and are adapted to close upon downward flexing of the support member relative to the holder.

A signal means, such as a buzzer and/or light, is electrically connected to the switch for alerting a fisherman upon closing thereof. The light, buzzer and a battery, adapted to energize the same, are mounted on an end cap assembly releasably connected to an end of the holder for expeditious assembly and disassembly thereof. A support stand, secured to the holder, is adapted to universally mount the fishing rod holder on the side rail or on the seat of a boat.

BRIEF DESCRIPTION OF THE DRAWINGS

Other objects of this invention will become apparent from the following description and accompanying drawings wherein.

DETAILED DESCRIPTION

Figure 1:
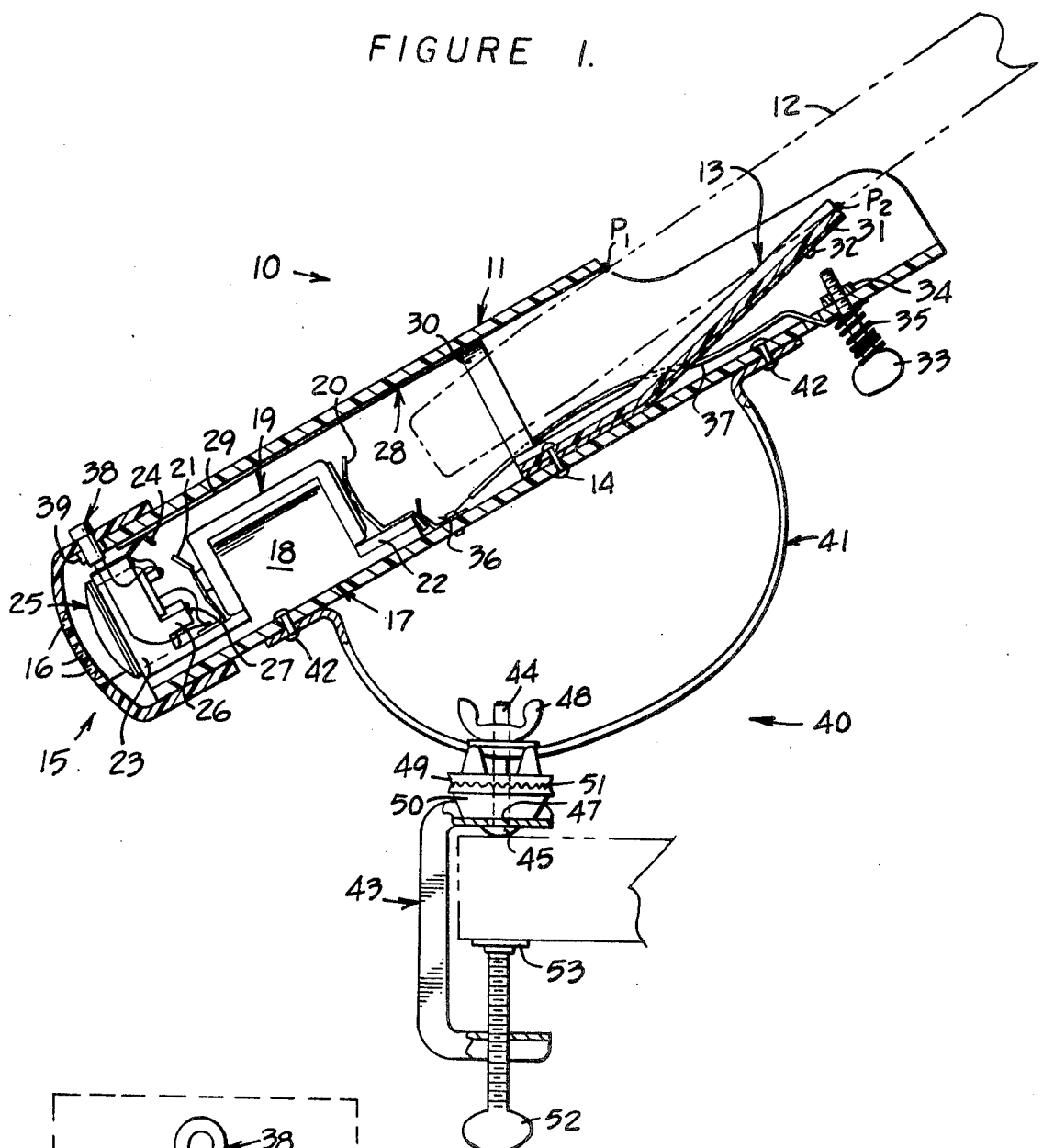
FIG. 1 is a longitudinal sectional view of a fishing rod holder embodying this invention mounted on a support stand adapted to be releasably secured on a boat.
Figure 2:
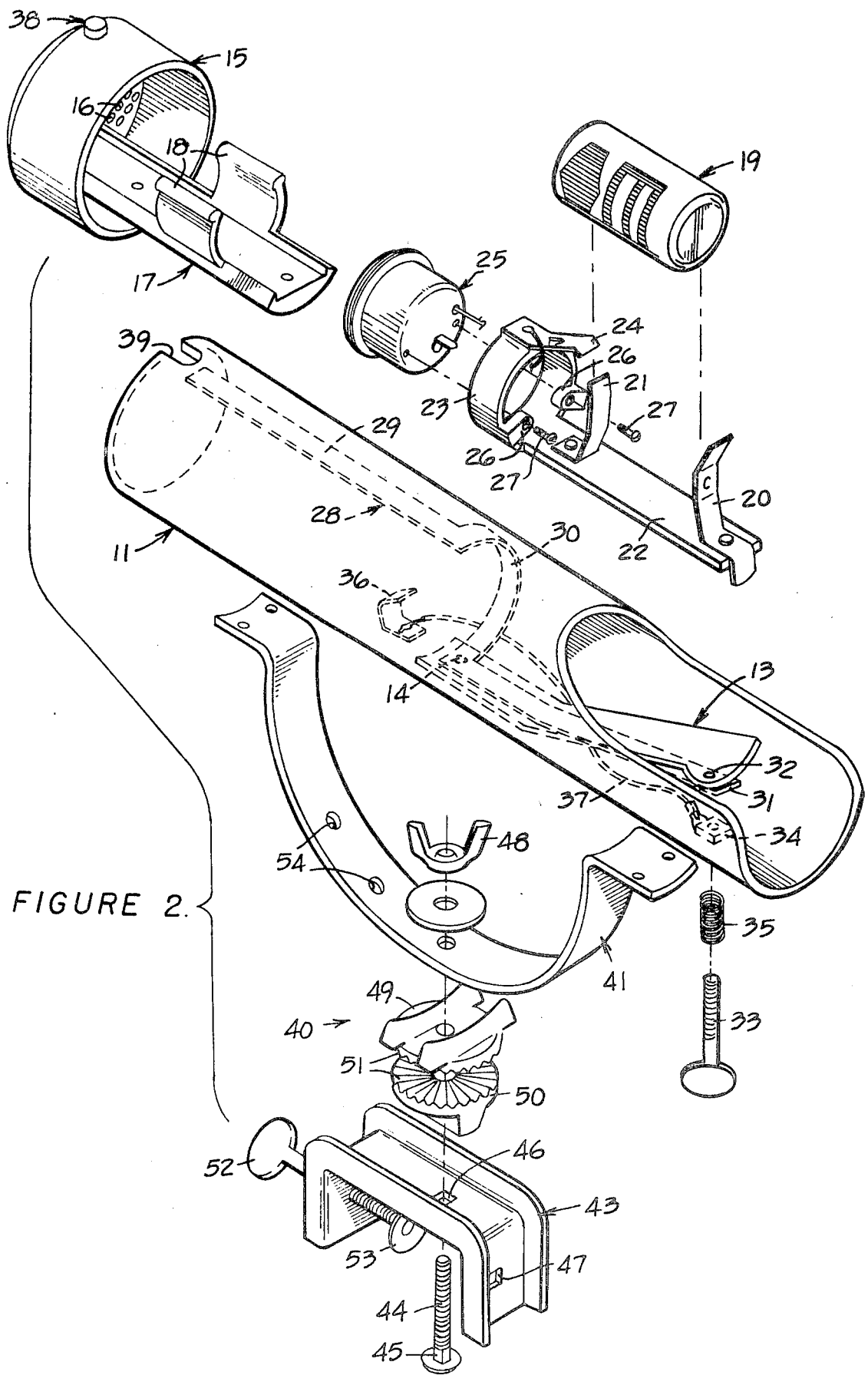
FIG. 2 is an exploded isometric view of the fishing rod holder and stand.

FIGS. 1 and 2 illustrates a fishing rod holder 10 comprising a tubular holder 11 adapted to retain the handle or butt end of a fishing rod 12 therein. A flexible support member 13 is disposed in the holder to extend in diverging relationship towards a forward end thereof. Means securing a rearward end of the support member on a bottom wall of the holder to mount the support member in cantilevered relationship thereon may comprise a single rivet 14.

An end cap 15 assembly is telescopically and releasably mounted on a rearward end of holder 11 and has a plurality of openings 16 formed therethrough to provide means for venting any water that may accumulate in the holder exteriorly thereof. The end cap assembly has an elongated bracket 17 secured thereon to form an integral part thereof. A pair of semi-cylindrical clamping members or means 18 are formed integrally on the bracket for clamping a standard dry cell battery 19 therebetween.

The battery is further clamped against axial movement between a pair of longitudinally spaced and flexible metallic terminals 20 and 21, secured on an elongated cartridge 22. The cartridge further comprises a cylindrical portion 23, formed integrally on an end thereof, having a flexible metallic sliding contact 24 secured thereon. Cylindrical portion 23 is adapted to receive the cylindrical housing of a buzzer unit 25 which may be fastened to a pair of lugs 26 by set screws 27 (one shown in FIG. 1).

As more clearly shown in FIG. 2, a metallic conductor strip 28 is secured to a bottom wall of holder 11 by rivet 14 which further secures the rearward end of support member 13 thereon. The conductor may be suitably formed as a continuous strip to comprise a longitudinally disposed first strip portion 29 adapted to engage contact 24, a semi-cylindrical intermediate strip portion 30 and a forwardly and longitudinally disposed strip portion 31 underlying support 13. If so desired, a forward end of strip portion 31 may be secured to support 13 by a rivet 32.

A metallic thumb screw 33 is threadably mounted in a metallic nut 34 suitably secured within holder 11. A compression coil spring 35 is mounted on the shank of the thumb screw for applying a biasing force against the head thereof to retain the thumb screw in a preset axial and adjusted position. As described hereinafter, the end of the thumb screw and strip portion 31 of conductor strip 28 comprise first and second electrical contact means, respectively, constituting a switch means adapted to close upon downward flexing of support member 13 relative to a holder when a downward force is applied on rod 12 (FIG. 1), such as when a fish is caught.

Nut 34 is electrically connected to a contact 36, secured to the bottom wall of holder 11, by a wire 37. As shown in FIG. 1, contact 36 engages terminal 20 whereas contact 24 engages strip portion 29 of conductor strip 28 to complete an electrical circuit on either side of battery 19. In addition to buzzer 25, signal means electrically connected to the battery and thus to the switch means strip portion 31 and thumb screw 33 comprising the light 38 mounted on cap assembly 15.

Figure 3:
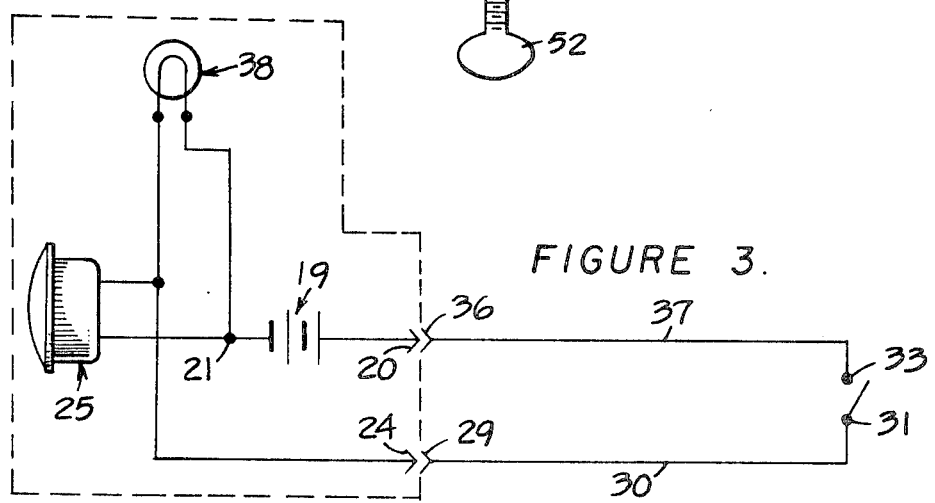
FIG. 3 schematically illustrates an electrical circuit for energizing a light and buzzer of the fishing rod holder.

As shown in FIG. 1, the light and buzzer are suitably electrically connected to the battery whereby they will be activated upon downward flexing of support 19 to engage strip portion 31 with an end of thumb screw 33. As shown in FIG. 2, a recess 39 is formed through a sidewall of holder 11 to accommodate light 38 therein. FIG. 3 schematically illustrates the electrical circuit for activating the light and buzzer.

As further shown in FIGS. 1 and 2, a support stand 40 comprises a generally U-shaped first bracket 41 suitably secured to holder 11 by rivets 42 or the like. A C-shaped second bracket 43 or C-clamp is releasably secured to first bracket 41 by a bolt 44 having a square head end 45 thereof adapted to engage either accommodating square hole 46 or 47, both formed through the second bracket. A thumb nut 48 is threadably mounted on an end of bolt 44 and a pair of rotary adjustment members 49 and 50 are mounted on the bolt and are disposed between the first and second brackets.

As shown, members 49 and 50 have interengaging teeth 51 formed thereon whereby bracket 41 and holder 11 may be rotated relative to bracket 43 to adjust the rotational position of the holder on a boat. A clamping bolt 52 is threadably mounted on second bracket 43 and has a clamping flange 53 mounted on an end thereof whereby support stand 40 may be mounted either on the rail or on the seat of a boat, depending upon whether bolt 44 is mounted in hole 46 or hole 47. It should be noted that first bracket 41 has a plurality of holes 54 formed therethrough to receive bolt 44 whereby the inclination of the first bracket and holder 11 may be adjusted relative to second bracket 43.

It should be understood that the main body of holder 11, support member 13, cap assembly 15 and associated bracket 17 and the main body portion of cartridge 22, including ring 23, are preferably composed of a semi-rigid plastic material such as polyvinylchloride (PVC). Such material not only provides electrical insulation to the composite fishing rod holder, but also exhibits a high degree of structural integrity and impact strength. Also, the plastic material composing support member 13 must be formed sufficiently thin to provide the desired flexibility whereby flexing thereof will close the contacts formed by strip portion 31 and thumb screw 33 when a predetermined force, such as the weight of the fish, is imposed on rod 12.

In operation, fishing rod holder 10 may be suitably mounted on the rail or seat of a boat by suitable adjustment of support stand 40, as explained above. The handle or butt end of fishing rod 12 is suitably mounted in holder 11 and rests on support member 13, as shown in FIG. 1. It should be noted that the forward portion of the holder is arcuately shaped to accommodate retention of the fishing rod thereon.

As further shown in FIG. 1, the rod engages the fishing rod holder in two-point contact, namely, point $P_1$ whereat an upper side of the fishing rod engages a forward edge of holder 11 and point $P_2$ whereat a lower side of the fishing rod engages the forward edge of support member 13. It should be further noted that the support member is sufficiently flexible to self-adjust the vertical distance between point $P_1$ and $P_2$ to accommodate varying sizes of fishing rod handles.

Thumb screw 33 is then suitably adjusted to position an end of thumb screw 33 relative to strip portion 31 to define the desired gap between the electrical contacts formed thereby. The electrical switch thus defined is adapted to be closed when the weight of a fish imposes a sufficient downward force on the fishing rod to close the contacts whereby buzzer 25 and light 38 will be activated to alert a fisherman.

I claim:

1. A fishing rod holder comprising
   a tubular holder adapted to retain a handle of a fishing rod therein,
   a flexible support member disposed in protected relationship within said holder to extend in diverging relationship relative to a bottom wall of said holder and towards a forward end thereof, a forward portion of said support member being arcuately shaped to accommodate and retain a handle of a fishing rod thereon,
   means securing a rearward end of said support member solely on the bottom wall of said holder whereby said support member is disposed in cantilevered relationship in said holder for flexing between first and second positions therein,
   normally open electrical first and second contact means mounted on said holder and on and beneath said support member in protected relationship within said holder, respectively, adapted to close upon downward flexing of said support member relative to said holder, and
   signal means electrically connected to said first and second contact means for alerting a fisherman upon closing of said contact means.

2. The fishing rod holder of claim 1 wherein said first contact means is mounted forwardly on said holder and means for selectively adjusting the gap between said first and second contact means.

3. The fishing rod holder of claim 2 wherein said first contact means comprises a thumb screw threadably mounted on said holder and having an end defining said first contact means.

4. The fishing rod holder of claim 3 further comprising a compression coil spring mounted on a shank of said thumb screw and disposed between a head of said thumb screw and said holder.

5. The fishing rod holder of claim 1 further comprising a cap assembly removably mounted on an end of said holder and having said signal means removably mounted thereon.

6. The fishing rod holder of claim 5 wherein said cap assembly comprises an elongated bracket formed integrally therewith and a cartridge removably mounted on said bracket.

7. The fishing rod holder of claim 6 wherein said signal means comprises a battery removably mounted on said cartridge and clamping means formed integrally on said bracket for clamping said battery and said cartridge thereon.

8. The fishing rod holder of claim 7 further comprising a pair of longitudinally spaced and flexible terminals secured on said cartridge, said battery mounted between said terminals.

9. The fishing rod holder of claim 8 further comprising a contact secured to a bottom wall of said holder and means electrically connecting said contact to said second electrical contact means and wherein one of said terminals engages said contact.

10. The fishing rod holder of claim 6 further comprising a sliding contact secured to said cartridge and means electrically connecting said sliding contact with said second electrical contact means.

11. The fishing rod holder of claim 10 wherein said last-mentioned means comprises a strip of metallic material secured in said holder and terminating at a forward end thereof at said second electrical contact means.

12. The fishing rod holder of claim 6 wherein said signal means comprises a buzzer unit mounted on said cartridge.

13. The fishing rod holder of claim 12 wherein said signal means further comprises a light mounted on said cap assembly.

14. The fishing rod holder of claim 1 further comprising support bracket means secured to said holder for universally mounting said holder thereon.

15. The fishing rod holder of claim 14 wherein said support bracket means comprises a first bracket secured to said holder, a second bracket and means rotatably mounting said first bracket on said second bracket.

16. The fishing rod holder of claim 15 wherein said second bracket is generally U-shaped and has a clamping bolt threadably mounted thereon, means defining a plurality of holes through said second bracket and wherein said first bracket is mounted on said second bracket by a bolt extending through one of said holes and through said first bracket.

17. The fishing rod holder of claim 16 further comprising means defining plurality of holes through said first bracket and wherein said last-mentioned bolt extends through one of said last-mentioned holes.

* * * * *